United States Patent [19]
Matsumoto et al.

[11] Patent Number: 5,950,748
[45] Date of Patent: *Sep. 14, 1999

[54] CRAWLER-BELT VEHICLE

[75] Inventors: Naoki Matsumoto; Yasutomo Abe; Masahiro Akiyama, all of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,927

[22] Filed: Dec. 9, 1996

[30]    Foreign Application Priority Data

Dec. 26, 1995  [JP]  Japan ..................................... 7-338949
Dec. 27, 1995  [JP]  Japan ..................................... 7-340570
Dec. 28, 1995  [JP]  Japan ..................................... 7-343826

[51] Int. Cl.$^6$ .................................................. B62D 55/08
[52] U.S. Cl. ......................... 180/6.24; 180/9.1; 180/9.38; 305/134; 280/124.116
[58] Field of Search .................................... 180/9.1, 9.21, 180/6.24, 6.26, 6.7, 9.26, 9.34, 9.36, 9.38; 305/134; 280/124.116

[56]        References Cited

U.S. PATENT DOCUMENTS

| | | | |
|---|---|---|---|
| 1,238,762 | 9/1917 | Hapeman | 180/9.21 |
| 2,057,211 | 10/1936 | Shere | 180/9.21 |
| 2,141,530 | 12/1938 | Guidroz | 180/9.38 |
| 2,161,760 | 6/1939 | Hacker | 180/9.36 |
| 3,275,836 | 9/1966 | Bexten | 305/134 |
| 3,333,867 | 8/1967 | Schultze | 180/9.1 |
| 3,682,266 | 8/1972 | Stoliker | 180/9.21 |
| 3,710,882 | 1/1973 | Marceau | 180/9.38 |
| 3,840,084 | 10/1974 | Mantha | 180/9.38 |
| 3,921,743 | 11/1975 | Parrish | 180/9.21 |
| 4,706,769 | 11/1987 | Latourelle et al. | 180/9.26 |
| 4,787,470 | 11/1988 | Badsey | 180/210 |
| 4,821,825 | 4/1989 | Somerton-rayner | 280/22 |
| 4,949,800 | 8/1990 | Virly | 180/9.21 |
| 5,467,839 | 11/1995 | Yoshio | 180/233 |
| 5,575,347 | 11/1996 | Uchibaba et al. | 180/9.1 |

FOREIGN PATENT DOCUMENTS

59-164270  9/1984  Japan .
58-247776  7/1985  Japan .

*Primary Examiner*—Kevin Hurley
*Attorney, Agent, or Firm*—Merchant, Gould, Smith, Edell, Welter & Schmidt, P.A.

[57]        ABSTRACT

A crawler-belt vehicle is a half crawler vehicle having front wheels furnished with tires, and crawlers on a rear wheel side composed of crawler belts extending between intermediate wheels and rear wheels. The front wheels are larger in diameter than the intermediate wheels and the rear wheels and, hence, have a large ground-contact surface area. Thus, while the vehicle is running on snow, the front wheels are not apt to sink in the snow to a greater extent with the result that the turning characteristic and breakthrough characteristic of the vehicle can be improved. The intermediate wheels may be set to toe in so as to prevent detachment of the crawler belts which would otherwise occur when the sub-beams are slightly flexed or deformed in a lateral outward direction under loads applied thereto while the vehicle is traveling at high speeds on the snow. In order to reduce side slips of the crawler belts, an intermediate line extending parallel to, and passing substantially intermediately between, an axle centerline of the intermediate wheels and an axle centerline of the rear wheels is arranged to meet with a turning center of the right front wheel, and a turning center of the left front wheel at the same point.

4 Claims, 10 Drawing Sheets

CRAWLER-BELT VEHICLE

BACKGROUND OF THE INVENTION

1. Field of the Invention

The present invention is concerned with the improvements in and relating to a crawler-belt vehicle (half-crawler vehicle) having front wheels furnished with tires and rear wheels with crawlers.

2. Description of the Related Art

Half-crawler vehicles are known as disclosed, for example, in Japanese Patent Laid-open Publication No. SHO 60-143189, entitled "OFF-ROAD VEHICLE", and Japanese Patent Laid-open Publication No. SHO 59-164270, entitled "FOUR-WHEEL-DRIVE CRAWLER VEHICLE".

The off-road vehicle disclosed in Japanese Patent Laid-open Publication No. SHO 60-143189 includes, as shown in FIGS. 2 and 3 of the same publication, front wheels attached to the front portion of a vehicle body frame and furnished with balloon tires. Rear wheels and intermediate wheels both furnished with balloon tires are attached to the rear portion of the vehicle body frame, with rubber crawler belts extending around the rear wheels and the intermediate wheels.

The four-wheel-drive crawler vehicle disclosed in Japanese Patent Laid-open Publication No. SHO 59-164270 includes, as shown in FIG. 1 of the same publication, front wheels attached to the front portion of a vehicle body, and rear wheels and intermediate wheels both furnished with tires and attached to the rear portion of the vehicle body, with rubber crawler belts running around the rear wheels and the intermediate wheels.

According to the half-crawler vehicle disclosed in Japanese Patent Laid-open Publication No. SHO 60-143189, however, since the front wheels serving as steered wheels and the rear wheels serving as driven wheels have substantially the same diameter, the front wheels acquire a smaller tread area than the crawler belts when the vehicle is running on snow. The front wheels are, therefore, liable to sink in the snow to such an extent that a sink-in-snow portion of the front wheels has a large area when viewed from the side of the wheels. Thus, at steering the front wheels are subjected to a great resistance of snow, failing to improve the turning performance of the half crawler vehicle. This problem becomes serious particularly when the vehicle is traveling over an untrodden field covered with virgin snow.

The same may be said of the four-wheel-drive crawler vehicle disclosed in Japanese Patent Laid-open Publication No. SHO 59-164270.

Particularly for the half crawler vehicles used for traveling over untrodden fields covered with new-fallen snow, a high breakthrough performance (capability of breaking a passage through a snow-covered untrodden field, for example) is required.

In the four-wheel-drive crawler vehicle disclosed in Japanese Patent Laid-open Publication No. SHO 59-164270, the rear wheel and the corresponding intermediate wheel on each side are attached in many cases to the vehicle body via a swingable sub-beam. In these cases, an arrangement is generally employed in which the intermediate wheel is attached to the outer end of a support shaft or spindle attached to a portion of the sub-beam extending toward the forward direction of travel of the vehicle.

With the half-crawler vehicle thus arranged, the sub-beam is subjected to a bending moment due to an unbalanced load applied when the intermediate wheel is loaded. For instance, when the half-crawler vehicle is running straight on snow at high speeds, the left and right sub-beams are slightly flexed or deformed, by bending moments applied via the intermediate wheels due to resistance of the snow, in such a manner that the sub-beams are spread or flared at their front end (in a lateral outward direction of the vehicle).

As a consequence, the intermediate wheels are toeing out, in which instance each crawler belt while running tends to displace in a lateral outward direction of the vehicle body as if the belt is running between conical rollers. This phenomenon cannot be avoided without difficulties.

The crawler belt is provided with a number of teeth (side guide portions) on its inside surface. When the crawler belt is displaced laterally and outwardly, the side guide portions are forced into pressure contact with the tires and thus increase a running resistance of the crawler belt. The running resistance becomes greater as the vehicle running speed increases.

In addition, the half-crawler vehicle is constructed such that the rear wheels and the intermediate wheels cannot be steered. Accordingly, an imaginary center of turn of each crawler is located substantially centrally between the rear wheel and the intermediate wheel on the same side. The imaginary turning center is determined by a dynamic weight distribution (weight distribution while the vehicle is running) between the front wheels, rear wheels and intermediate wheels.

Accordingly, the crawlers tend to cause a side slip (a slip in the vehicle width direction) at positions directly beneath the rear wheels and the intermediate wheels. Since an undue slip would result in detachment of the crawler belts, the amount of side slip and a side slip produced thereby should preferably be minimized.

SUMMARY OF THE INVENTION

It is accordingly an object of the present invention to provide a crawler-belt vehicle which is improved in its turning performance and breakthrough performance on snow or a muddy road surface.

Another object of the present invention is to provide a crawler-belt vehicle in which crawler belts are prevented from displacing in a lateral outward direction of the vehicle body, thereby reducing the running resistance of the crawler belts.

Still another object of the present invention is to provide a crawler-belt vehicle which is capable of maintaining a good turning performance on a road surface having a large running resistance without causing detachment of a crawler belt.

According to a first aspect of the present invention, a crawler-belt vehicle includes front wheels which are larger in diameter than the intermediate wheels and the rear wheels that are furnished with crawler belts. The front wheels have a larger tread area than the prior front wheels having the same diameter as the intermediate and rear wheels, and so while the vehicle is running on snow, the front wheels have only a small sink-in-snow depth, and sink-in-snow portions of the respective front wheels have a small area when viewed from the side of the wheels.

In this condition, when the front wheels are steered, the crawler-belt vehicle encounters only a small resistance of the snow and hence can exhibit a good turning performance.

By virtue of the large-diameter front wheels, the crawler-belt vehicle can easily ride across and wedge through snow and hence exhibits a good breakthrough performance on the snow.

By the use of the large-diameter front wheels, the minimum ground clearance of the frame, particularly in the vicinity of the front axle shafts and the front wheels, can readily be increased. The crawler-belt vehicle having such increased minimum ground clearance can exhibit a good traveling performance on the snow.

Furthermore, since the intermediate wheels and rear wheels are both smaller in diameter than the front wheels, the length of the crawlers can be reduced. With this reduction in length of the crawler belts, the gross weight of the crawler-belt vehicle can be reduced. The small-diameter intermediate and rear wheels also provide a reduction in vehicle height in the vicinity of the crawlers.

With the low-profile crawlers thus provided, the crawler-belt vehicle has a low center of gravity and hence possesses an improved degree of running stability.

In one modified form of the present invention, the crawler-belt vehicle includes crawlers each composed of a rear wheel, an intermediate wheel, and a crawler belt extending between the rear wheel and the intermediate wheel.

The front wheels have an overall height which is greater than the overall height of the crawlers. This arrangement, as opposed to an arrangement in which the front wheels and the crawlers have the same overall height, ensures that when the vehicle is running on snow, the front wheels are not apt to sink in the snow to a greater extent, and a sink-in-snow portion of the front wheels has a small area when viewed from the side of the wheels. The front wheels on turns are subjected to a small resistance of snow, thus improving the turning characteristic of the crawler-belt vehicle.

In addition, since the front wheels have a large diameter, they can readily ride over and wedge through the snow. Thus, the crawler-belt vehicle can exhibit a good breakthrough performance on the snow.

Another advantage attainable by the large-diameter front wheels is that the minimum ground clearance of the frame, particularly in the vicinity of the front axle shafts and the front wheels, can be readily increased. The crawler-belt vehicle having such increased minimum ground clearance can exhibit a good traveling performance on the snow.

Furthermore, since the overall height of the crawlers are smaller than that of the front wheels, the length of the crawlers can be reduced. With this reduction in the crawler belt length, the gross weight of the crawler-belt vehicle can be reduced. The vehicle height in a region around the crawlers is relatively small, and so the crawler-belt vehicle has a low center of gravity which improves the running stability of the crawler-belt vehicle.

According to a second aspect of the present invention, intermediate wheels that are furnished with crawler belts together with rear wheels are set to toe in.

The intermediate wheels that toe in tend to roll substantially straight when the sub-beams are slightly flexed or deformed due to loads acting on the intermediate wheels during the travel of the crawler-belt vehicle. The crawler belts are held in position against lateral outward displacement and can reduce a contact pressure between side guide portions on the crawler belts and the intermediate and rear wheels, thereby lowering a running resistance of the crawler-belt vehicle.

Thus, the crawler belts are free from undue lateral outward displacement and highly resistant to detachment from the associated wheels which would otherwise occur when the crawler-belt vehicle is running straight or making turns. Even under a severe condition in which the crawler-belt vehicle traveling at a low speed is steered with a maximum steering angle (lock-to-lock steering operation), the crawler belts are held in position against detachment from the associated wheels and, hence, the vehicle can continue its stable traveling operation.

Since the crawler belts have apparent toe-in acquired as a result of toe-in of the intermediate wheels, the steering stability of the crawler-belt vehicle can be improved particularly when the vehicle is running on a road surface having a great running resistance.

The toe-in of the intermediate wheels can be set by a simple mechanism which is preferably comprised of axes of intermediate axle spindles inclined toward the forward direction of travel of the vehicle.

According to a third aspect of the present invention, an intermediate line extending parallel to, and passing substantially intermediately between, an axle centerline of the intermediate wheels and an axle centerline of the rear wheels is arranged to meet with a turning center of the right front wheel, and a turning center of the left front wheel at the same point. This arrangement makes it possible to reduce or minimize the deviation of each crawler belt from its imaginary turning center. The crawler belts can only produce a small side slip, are free from a danger of detachment from the associated wheels, and can exhibit a smooth turning performance on a road surface having a great running resistance. In addition, a side slip force acting on the crawler belts at positions directly below the respective intermediate and rear wheels is small, so that the detachment of the crawler belts can be perfectly prevented.

The above and other objects, features and advantages of the present invention will become manifest to those versed in the art upon making reference to the detailed description and accompanying sheets of drawings in which preferred structural embodiments incorporating the principles of the present invention are shown by way of illustrative example.

BRIEF DESCRIPTION OF THE DRAWINGS

FIGS. 7A and 7B are diagrammatical views showing the operation of the crawler-belt vehicles provided for comparison between an inventive example in which intermediate wheels are set to toe in, and a comparative example in which intermediate wheels are set straight without toe in;

DETAILED DESCRIPTION OF THE PREFERRED EMBODIMENTS

Figure 3:
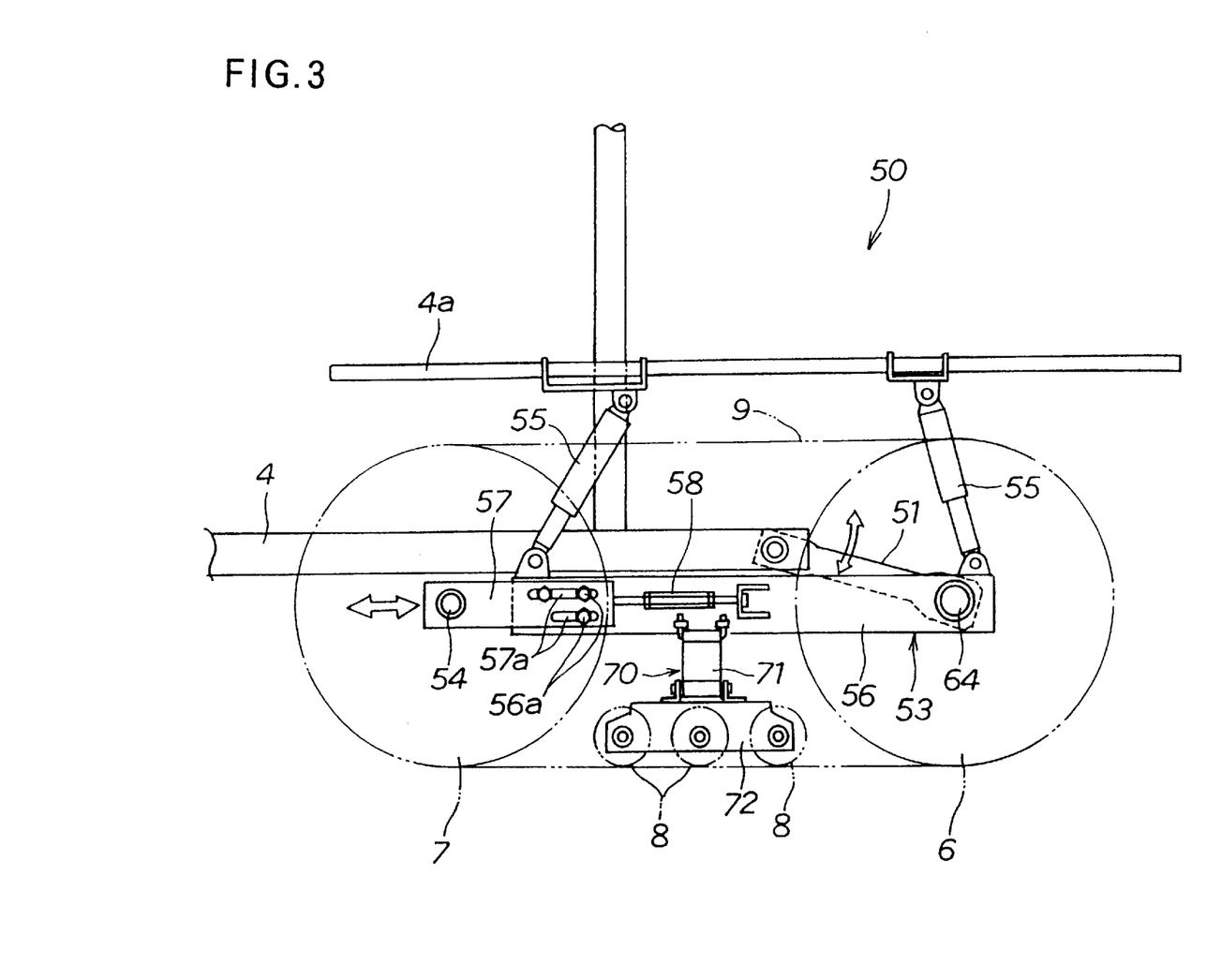
FIG. 3 is a detailed side view showing a rear suspension unit on enlarged scale.
Figure 4:
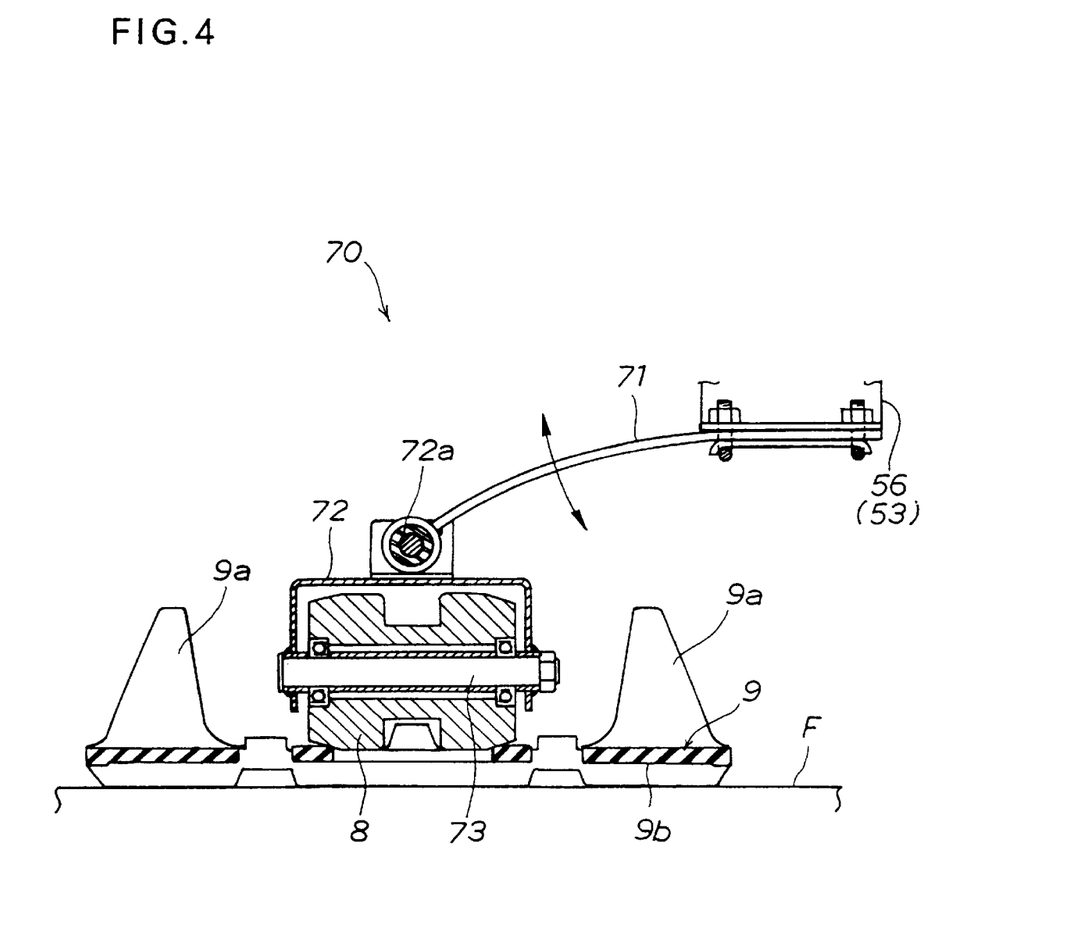
FIG. 4 is a detailed cross-sectional view of a roller wheel support mechanism.
Figure 5:
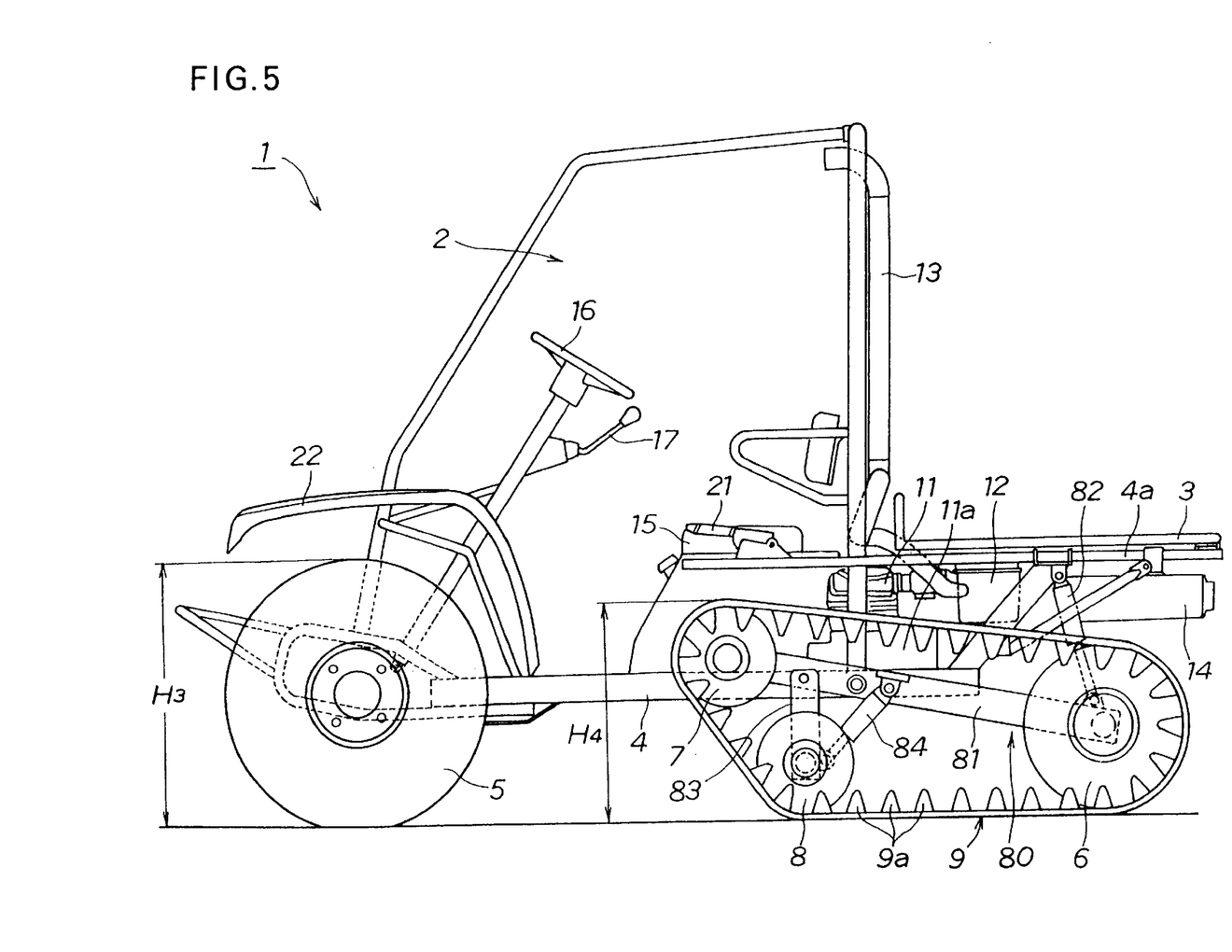
FIG. 5 is a side view showing a modification of the crawler-belt vehicle shown in the first embodiment.

FIGS. 1 through 4 show an embodiment of a crawler-belt vehicle according to a first aspect of the present invention, and FIG. 5 shows a modification of the crawler-belt vehicle.

Figure 1:
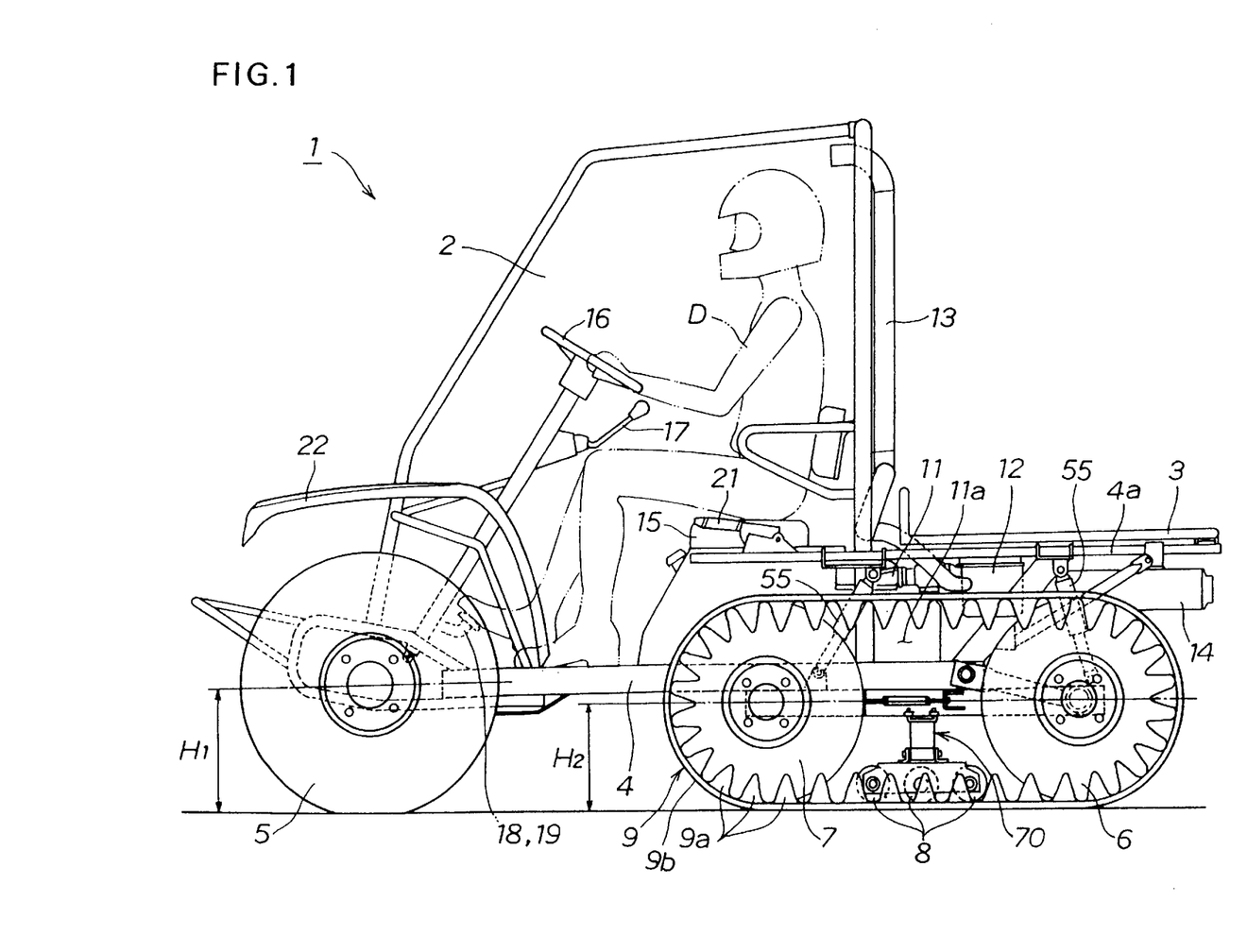
FIG. 1 is a side view of a crawler-belt vehicle according to a first embodiment of the present invention.

In FIG. 1 the crawler-belt vehicle 1 is shown as a vehicle (half-crawler vehicle) having front wheels furnished with tires and rear wheels with crawlers.

The crawler-belt vehicle 1 includes a cabin 2 and a load-carrying platform 3 that are provided on a front portion and a rear portion, respectively, of a vehicle body frame 4 (vehicle body). Front wheels 5 serving as drive wheels, rear wheels 6 also serving as drive wheels, intermediate wheels 7 disposed between the front and rear wheels 5, 6 and serving as idler wheels, and a pair of sets of three roller wheels 8 disposed between the intermediate and rear wheels are attached to the opposite sides of the vehicle body frame 4 (only those wheels on the left side of the vehicle being shown), with crawler belts 9 trained around the rear wheels 6 and the intermediate wheels 7 on the respective sides. The crawler-belt vehicle 1 of the foregoing construction is a four-wheel-drive crawler vehicle.

The front wheels 5, rear wheels 6 and intermediate wheels 7 are furnished with rubber tires containing air.

The tires are balloon tires. The front wheels 5 have a diameter larger than the diameter of the rear wheels 6 and the diameter of the intermediate wheels 7, and so the center height $H_1$ of the front wheels 5 is greater than (or located at a higher position than) that $H_2$ of the rear wheels 6 and intermediate wheels 7.

The crawler belts 9 are made of a flexible material such as rubber and each include two rows of inwardly projecting side guide portions 9a provided on an inside surface of the crawler belt 9 at regular intervals along the length of the crawler belt 9 for guiding opposite shoulder portions of the respective tires, and a ground-contact surface or tread 9b having a tread pattern.

The load-carrying platform 3 is attached to a rear frame 4a provided integrally on the top of a rear portion of the vehicle body frame 4. The rear portion of the vehicle body frame 4 is equipped with an engine 11 having a transmission 11a. Reference numeral 12 denotes an air cleaner, 13 an air intake pipe, 14 a muffler, 15 a driver's seat, 16 a steering wheel, 17 a shift lever, 18 an accelerator pedal, 19 a brake pedal, 21 a parking brake handle, and 22 a front fender.

Figure 2:
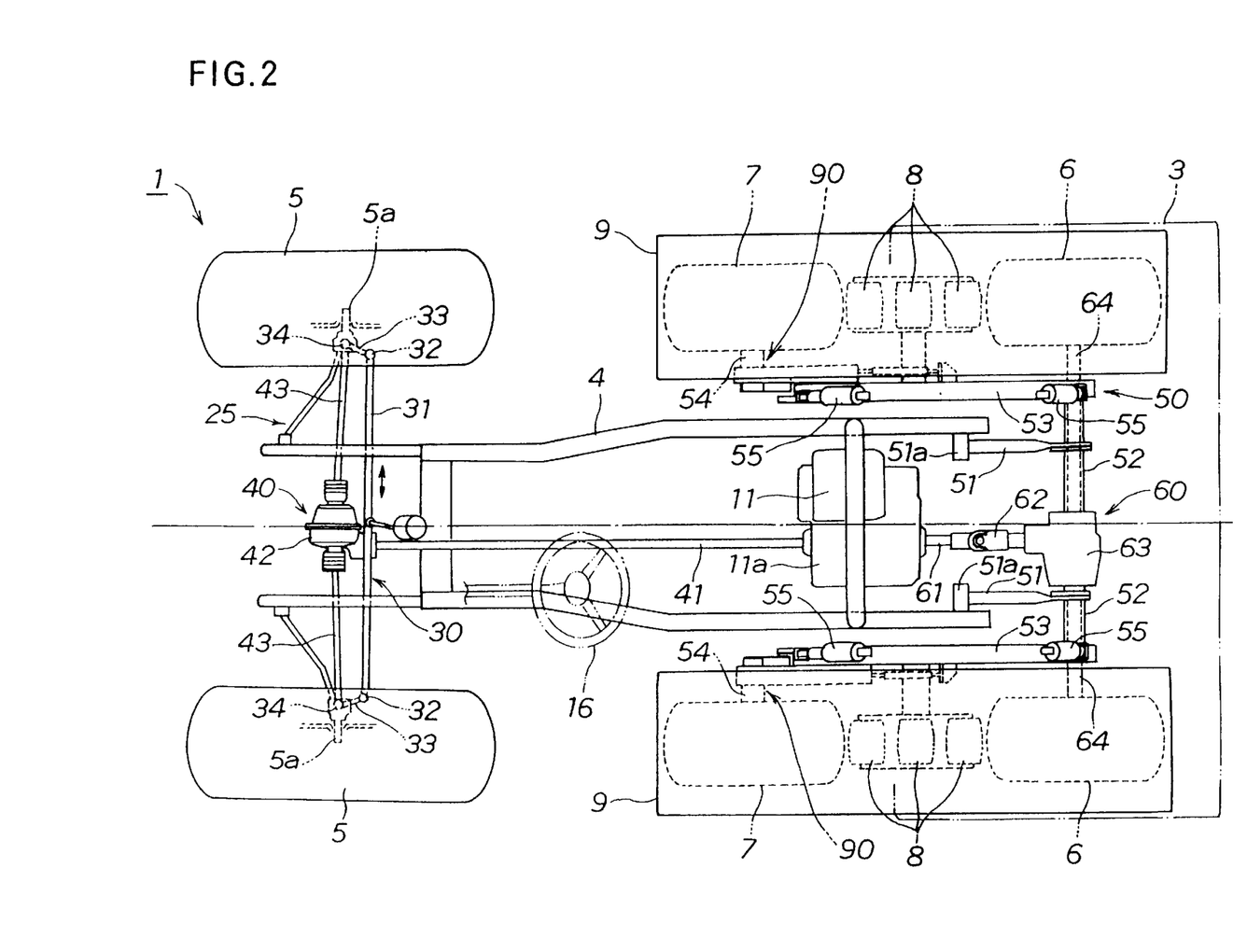
FIG. 2 is a plan view of the crawler-belt vehicle shown in FIG. 1.

FIG. 2 is a top plan view of the crawler-belt vehicle 1 shown in FIG. 1, with the cabin 2 and the load-carrying platform 3 removed for clarity, the platform 3 being partly illustrated by the phantom lines.

As shown in FIG. 2, the vehicle body frame 4 is equipped with a front suspension 25, a steering device or system 30, and a front wheel driving unit 40 that are provided on a front portion of the vehicle body frame 4.

The rear portion of the vehicle body frame 4 is equipped with a rear suspension unit 50, and a rear wheel driving unit 60.

The steering system 30 comprises a tie rod 31 for transmitting a steering force exerted on the steering wheel indicated by the phantom lines, a pair of tie rod ends 32, 32 at opposite ends of the tie rod 31, a pair of knuckle arms 33, 33 connected to the tie rod ends 32, 32, respectively, and a pair of kingpins 34, 34 connecting the knuckle arms 33, 33 and a pair of support shafts or spindles 5a, 5a of the respective front wheels 5, 5, respectively.

The front wheel driving unit 40 includes a propeller shaft (drive shaft) 41 extending forwardly from a front portion of the transmission 11a, a differential unit 42 coupled to the propeller shaft 41, and left and right axle shafts 43, 43 connected at opposite ends with the differential unit 42 and the corresponding spindles 5a, 5a of the front wheels 5, 5.

The rear suspension unit 50 comprises a pair of left and right swing arms 51, 51 swingably attached at one end to a rear end portion of the vehicle body frame 4 via a pair of shafts 51a, 51a, respectively, and extending rearwardly from the vehicle frame body 4, a swing tube (axle housing) 52 extending transversely through the distal ends (free ends) of the respective swing arms 51, 51, a pair of sub-beams 53, 53 swingably attached at one end to the opposite ends of the swing tube 52 and extending forwardly of the vehicle body frame 4, a pair of intermediate wheel support shafts or spindles 54, 54 attached to the distal ends (free ends) of the respective sub-beams 53, 53 for rotatably supporting the intermediate wheels 7, 7, and two pairs of oil dampers 55, 55 each attached to the fore and rear ends of a corresponding one of the sub-beams 53, 53.

The oil dampers 55 will be described in greater detailed with reference to FIG. 3.

The rear wheel driving unit 60 is composed of a propeller shaft (drive shaft) 61 extending rearwardly from a rear portion the transmission 11a, a differential unit 6 3 connected to the propeller shaft 61 via a universal joint 62, and left and right axle shafts 64, 64 connected at one end to the differential unit 63. The axle shafts 64, 64 are connected at their opposite end to the rear wheels 6, 6, respectively.

The differential unit 63 and the axle shafts 64, 64 are disposed coaxially with the swing tube 52 and connected together such that they are swingable together with the swing tube 52. Thus, the differential unit 63 and the axle shafts 64 form a part of the rear suspension unit 50. The swing tube 52 rotatably supports the axle shafts 64 that are inserted in the swing tube 52.

FIG. 3 is a detailed side view of the rear suspension unit 50. As shown in this figure, each of the sub-beams 53 of the rear suspension unit 50 is suspended at its front and rear ends from the rear frame 42 via one pair of oil dampers (shock absorbers) 55, 55.

The sub-beam 53 is so constructed as to enable adjustment of a tension on the corresponding crawler belt 9. More specifically, the sub-beam 53 is composed of a beam member 56 suspended horizontally by the oil dampers 55, 55, and a beam extension member 57 slidably mounted on a side surface of the front end portion of the beam member 56 via a connection between parallel spaced slotted holes 57a and pins 56a slidably received therein. The beam member 56 and the beam extension member 57 are connected together by a turnbuckle 58 so that an extent of sliding movement of the beam extension member 57 relative to the beam member 56 can be adjusted by actuating the turnbuckle 58 in an appropriate manner. By virtue of the sliding movement of the beam extension member 57 attained via the turnbuckle 58 the tension on the crawler belt can be adjusted.

The three roller wheels 8 are attached to the beam member 56 via a roller wheel support mechanism 70. The beam extension member 57 has a front end portion supporting thereon the intermediate wheel spindle 54.

The roller wheel support mechanism 70, as shown in greater detail in FIG. 4, includes a leaf spring 71 attached at one end (proximal end) to a lower surface of the beam member 56 of the sub-beam 53 for urging the individual roller wheels 8 downwardly. The other end (distal end) of the leaf spring 71 projects laterally outwardly from the beam member 56 and supports thereon a downwardly open, channel-shaped holder 72 via a horizontal shaft 72a such that the holder 72 is oscillatable left and right about the shaft 72a. The three roller wheels 8 are arranged in series in the direction of travel of the vehicle (or the direction perpendicular to the drawing sheet containing FIG. 4) and rotatably mounted on the holder 72.

The leaf spring 71 continuously urges the roller wheels 8 in a downward direction (toward the undersurface of a lower portion of the crawler belt 9) with the result that the tread 9b of the crawler belt 9 is urged against a road surface F via the roller wheels 8.

The three roller wheels 8 are much smaller in diameter than the rear wheel 6 and the intermediate wheel 7, as shown in FIG. 1, and at least an outer peripheral portion of each roller wheel 8 is formed by a flexible material such as rubber. The roller wheels 8 may be furnished with tires, such as rubber tires containing air. Reference numeral 73 shown in FIG. 4 denotes a shaft for rotatably supporting the roller wheels 8 on the holder 72.

Operation of the crawler-belt vehicle 1 of the foregoing construction will be described with reference to FIG. 1.

The front wheels 5 have a larger diameter than the rear wheels 6 and the intermediate wheels 7. Accordingly, when the crawler-belt vehicle 1 is running on snow, the front wheels 5 acquire a large tread area and, hence, sink in the snow only to a limited or small extent. Thus, a sink-in-snow portion of the front wheels 5 has a large area when viewed from the side of the wheels 5. Thus, at steering the front wheels 5 encounter only a relatively small resistance of snow and, hence, the crawler-belt vehicle can exhibit a good turning performance.

In addition, since the front wheels 5 are larger in diameter than the intermediate wheels 7, they can readily ride over and wedge through the snow, thus improving the break-through performance of the crawler-belt vehicle 1 while the vehicle is running on the snow.

FIG. 5 is a side view showing a modified form of the crawler-belt vehicle of the foregoing embodiment. The modified crawler-belt vehicle 1 includes a pair of crawler assemblies each composed of a rear wheel 6 serving as an idler wheel, an intermediate wheel 7 serving as a drive wheel, a roller wheel 8 disposed between the rear wheel 6 and the intermediate wheel 7, and a crawler belt 9 extending between the rear wheel 6 and the intermediate wheel 7. The intermediate wheel 7 has a center height which is greater than the center height of the rear wheel 6 and the center height of the roller wheel 8. The front wheels 5 have a diameter greater than the overall height $H_4$ of the crawler assemblies, and the overall height $H_3$ of the front wheels 5 is greater than the overall height $H_4$ of the crawler assemblies. The rear wheels 6, intermediate wheels 7 and roller wheels 8 in this embodiment should by no means limited to a construction furnished with tires and may be composed of sprockets.

A rear suspension unit 80 includes a sub-beam 81 rotatably connected at its intermediate portion to a rear portion of the vehicle frame body 4 so that the sub-beam 81 is swingable up and down in a vertical plane about its intermediate portion. The sub-beam 81 has a front end and a rear end to which one of the intermediate wheels 7 and a corresponding one of the rear wheels 6 are rotatably attached, respectively. The rear end of the sub-beam 81 is suspended from the rear frame 4a by means of an oil damper 82.

The rear suspension unit 80 further includes a swing arm 83 pivotally connected at one end to a portion of the sub-beam 81 so that the swing arm 83 is swingable back and forth about the one end (fixed end). The other end (free end) of the swing arm 83 extends vertically downwardly and rotatably supports thereon one of the roller wheels 8.

The free end of the swing arm 83 is connected to the sub-beam 81 via an oil damper 84.

According to the modified embodiment, the diameter of the front wheels 5, that is, the overall height $H_3$ of the front wheels 5 is greater than the overall height $H_4$ of the crawler assemblies. Accordingly, when the crawler-belt vehicle 1 is running on snow, the front wheels 5 acquire a greater tread area than those having the same overall height as the crawler assemblies. Assuming that the crawler-belt vehicle 1 has the same weight as the conventional vehicle, the front wheels 5 sink in the snow to a smaller extent than those of the conventional vehicle. This means that a sink-in-snow portion of the front wheels 5 has a small area when viewed from the side of the wheels 5. At steering the front wheels 5 encounter only a small resistance of snow, and so the vehicle can exhibit a good turning performance.

Figure 6:
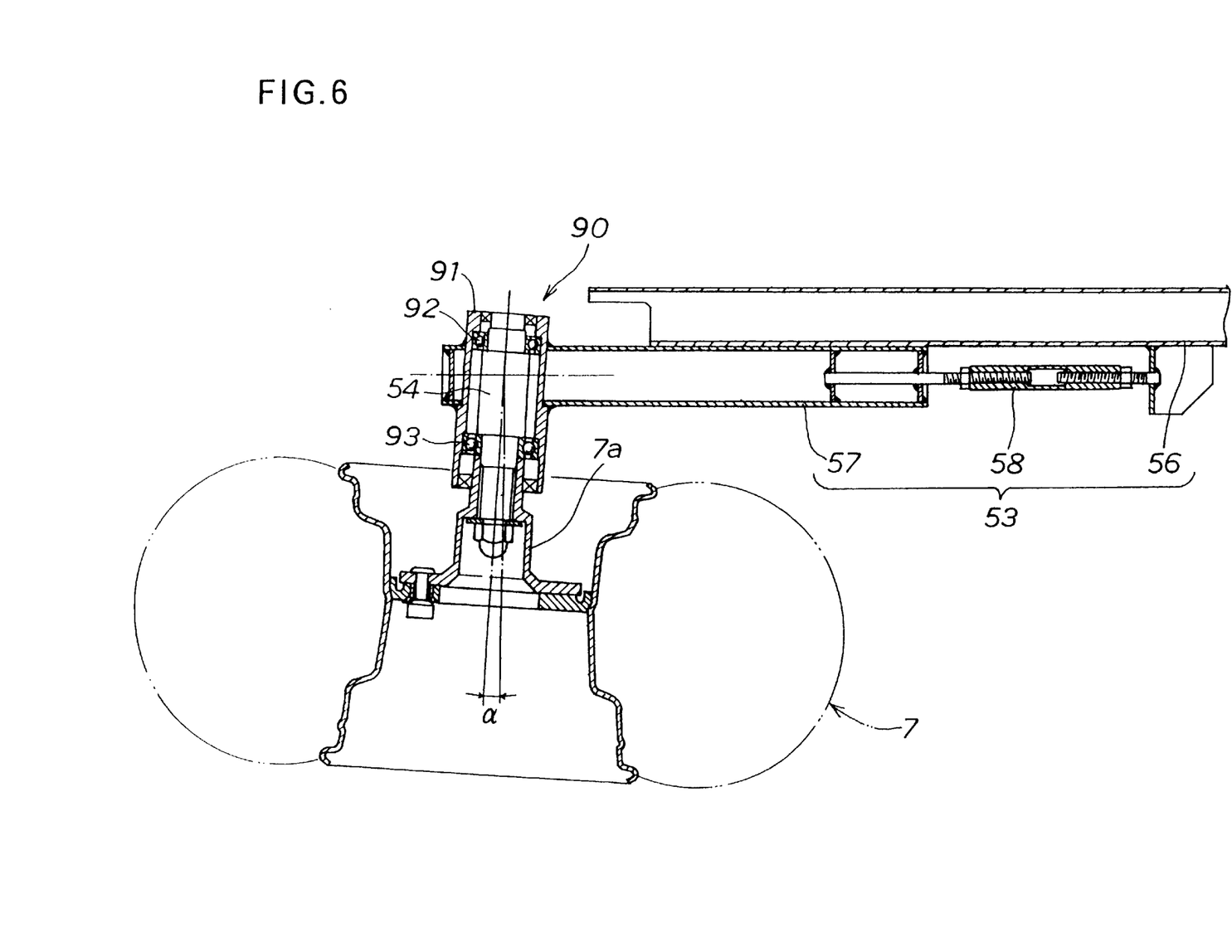
FIG. 6 is a cross-sectional view of an intermediate wheel support mechanism according to the present invention.

FIG. 6 is a cross-sectional view of an intermediate wheel support mechanism according to a second aspect of the present invention, showing the intermediate wheel support mechanism 90 on the left side when viewed from the direction of travel of the crawler-belt vehicle. The intermediate wheel support mechanism on the right side is symmetrical with the illustrated left side intermediate wheel support mechanism 90 and, hence, description of the right side intermediate wheel support mechanism will be omitted.

The intermediate wheel support mechanism 90 is a mechanism that supports the intermediate wheel 7 via the intermediate wheel spindle 54. The intermediate wheel support mechanism 90 includes a tubular support member 91 fixed to the front end of the beam extension member 57. In the support member 91, the intermediate wheel spindle 54 is rotatably mounted via a pair of bearings 92, 93. The intermediate wheel spindle 54 has an outer end extending outwardly of the vehicle width direction to which a wheel hub 7a of the rear wheel 7 is attached by a bolt.

The intermediate wheel support mechanism 90 is constructed such that an axis of the rear wheel 7 is set to incline forwardly of the direction of travel (leftward direction of FIG. 6) of the vehicle at a predetermined toe-in angle (inclination angle) α, thereby placing the intermediate wheel 7 in a toe-in position. The toe-in angle α is determined such that when the sub-beam 53 undergoes slight resilient deformation due to a bending moment caused by an unbalanced load applied during movement of the vehicle, the intermediate wheel 7 that toes in rolls substantially straight in the direction of travel of the vehicle. With the toe-in thus provided, the crawler belt 9 shown in FIG. 1 is prevented from displacing outwardly of the vehicle width direction and, hence, the contact pressure between the intermediate wheel 7 and the side guide portions 9a of the crawler belt 9 is reduced. Consequently, a substantial reduction of running resistance is obtained.

Operation of the crawler-belt vehicle of the foregoing construction will be described below with reference to FIGS. 7A and 7B.

Figure 7A:
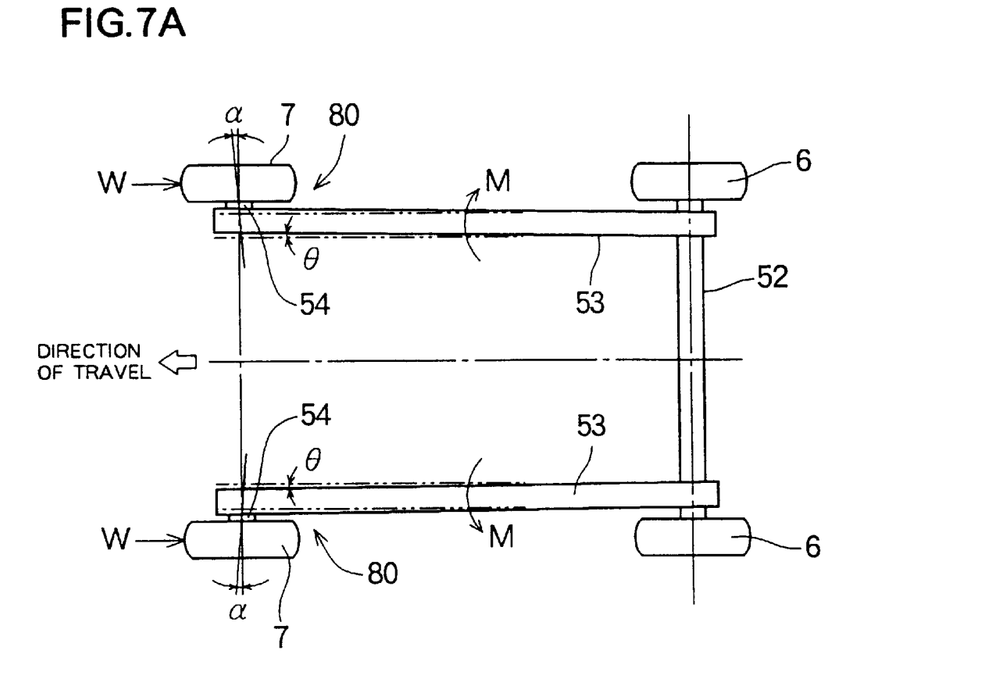
Figure 7B:
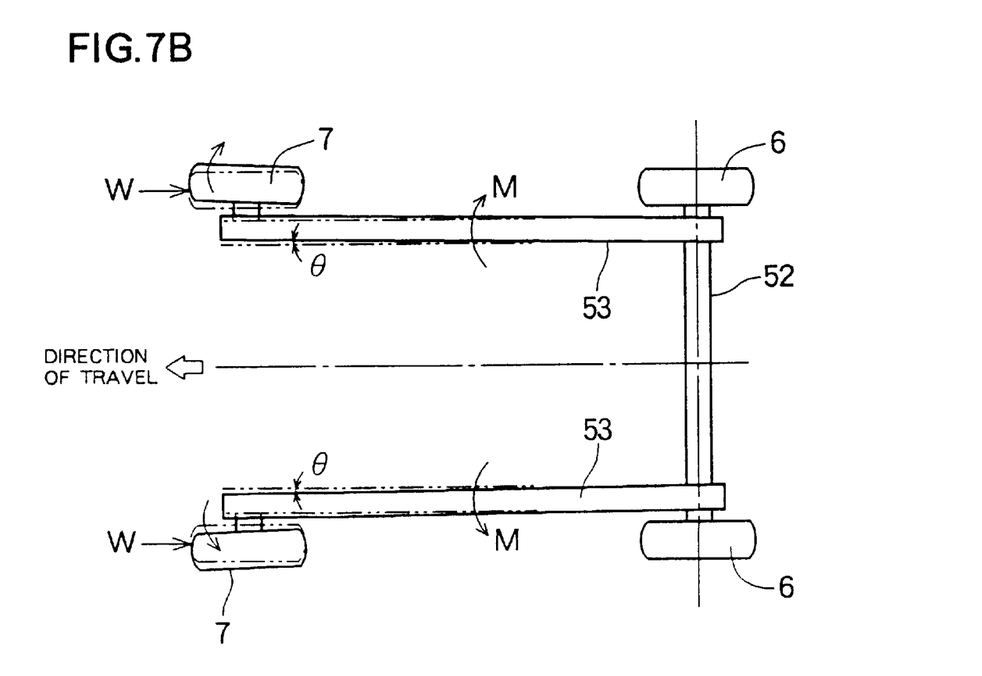

FIGS. 7A and 7B are diagrammatical views showing the operation of the crawler-belt vehicles according to the present invention. More specifically, FIG. 7A shows an arrangement according to the embodiment shown in FIG. 6 in which the intermediate wheels 7 are set to toe in, and FIG. 7B shows an arrangement according to a comparative example in which the intermediate wheels 7 are set to straight without toe-in.

As shown in FIGS. 7A and 7B, when the crawler-belt vehicle is moving or running straight on snow at high speeds, the intermediate wheels 7, 7 are subjected to a load W due to a resistance of snow. Under such condition, the left and right sub-beams 53, 53 are subjected to a bending moment M due to an unbalanced load and thus caused to resiliently flex or deform in such a manner that the sub-beams 53, 53 diverge at their front ends at a deflection angle θ.

As shown in FIG. 7B, in the case of the intermediate wheels 7, 7 not having toe-in, they tend to toe out (in the position indicated by the solid lines) as a result of outward deformation of the sub-beams 53, 53. The crawler belts 9 (see FIG. 2) are, therefore, likely to be displaced outwardly of the vehicle width direction.

Conversely, in the case of the intermediate wheels 7, 7 that toe in, as shown in FIG. 7A, when the sub-beams 53, 53 are deflected outwardly from the original straight position (indicated by the phantom lines) to the deflected position (indicated by the solid lines) by the deflection angle θ, the front edges of the intermediate wheels 7 diverge at an angle equal to the toe-in angle α which is substantial the same as the deflection angle θ, whereby the intermediate wheels 7, 7 are held in the substantially straight ahead position. Thus, the crawler belts 9, 9 (see FIG. 2) are kept in position against undue lateral outward displacement, and the contact pressure between the intermediate wheels 7 and the side guide portions 9a (see FIG. 1) is reduced, resulting in a low running resistance.

In the embodiment described above, the intermediate wheels 7 are set to toe in by an arrangement in which axes of the intermediate wheel spindles 54, 54 are inclined toward the direction of travel of the vehicle. It is possible according to the present invention to employ another arrangement in which the intermediate wheels 7, 7 are attached to the sub-beams 53, 53 such that they are swingable back and forth, and the toe-in angle of the intermediate wheels 7 can be adjusted by actuating turnbuckles provided between the intermediate wheels 7, 7 and the sub-beams 53, 53.

The rear wheels 6, 6 have no need of toe-in and are attached out of parallel relation to (or alignment with) the intermediate wheels 7, 7.

By virtue of toe-in, the intermediate wheels 7, 7 tend to roll straight when the sub-beams 53 undergo slight resilient deformation due to unbalanced loads applied during the travel of the crawler-belt vehicle. Consequently, the crawler belts 9, 9 are prevented from displacing laterally outwardly, thereby lowering the contact pressure between the intermediate wheels 7, 7 and the side guide portions 9a of the crawler belts 9. Thus, the vehicle can travel with a small running resistance.

Since the lateral outward displacement of the crawler belts 9, 9 is prevented as described above, the crawler belts 9, 9 are highly resistant to detachment when the crawler-belt vehicle is running straight or making turns. Even under a severe operating condition which may observed when the crawler-belt vehicle while moving at low speed is steered at a maximum steering angle (lock-to-lock steering), the crawler-belt vehicle can continue stable traveling without causing detachment of either crawler belt.

By virtue of the intermediate wheels 7 that toe in, the crawler belts 9 have apparent toe-in which will improve the steering stability of the vehicle particularly when the vehicle is running on a road surface having a large frictional resistance.

The intermediate wheels can be set to toe in by a simple mechanism merely consisting of inclining the outer ends of the intermediate wheel spindles 54, 54 toward the forward direction of travel of the vehicle.

Figure 8:
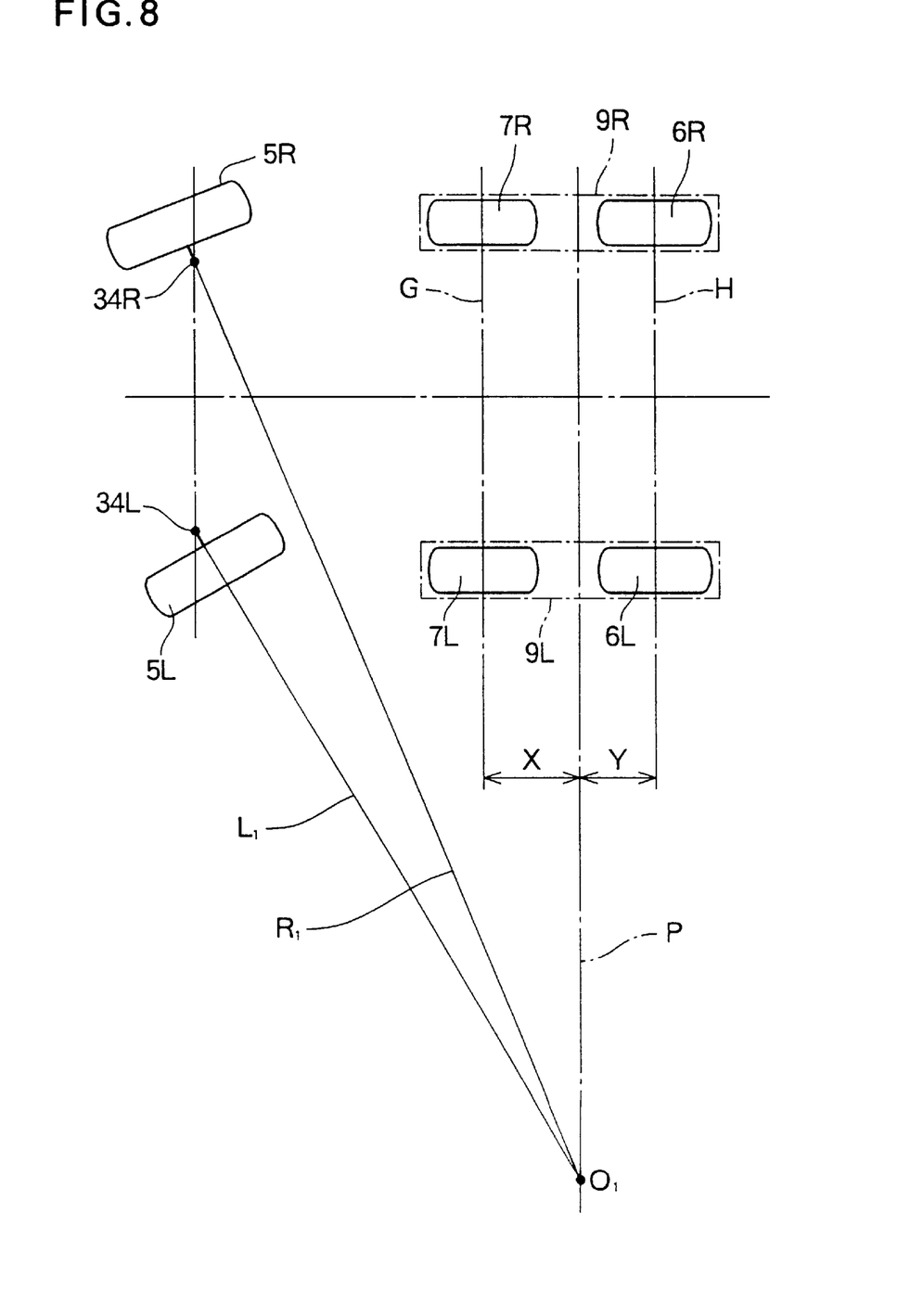
FIG. 8 is a diagrammatical view showing a steering geometry of a crawler-belt vehicle according to the present invention.

FIG. 8 is a diagrammatical view showing a steering geometry of a crawler-belt vehicle according to a third aspect of the present invention. For purposes of illustration, reference characters used to designate parts on the right side of the vehicle are affixed with letter "R", and reference characters used to designate parts on the left side of the vehicle are affixed with letter "L". For examples, the right front wheel and the left front wheel are designated by "5R" and "5L", respectively.

The steering geometry of the crawler-belt vehicle includes a rear axle centerline H (axis of the axle shaft 64 shown in FIG. 2) of the left and right rear wheels 6L, 6R, an intermediate axle centerline G (axis of the intermediate wheel spindle 54 shown in FIG. 2) of the left and right intermediate wheels 7L, 7R, and an intermediate line P so described as to pass substantially intermediately between the rear axle centerline H and the intermediate axle centerline G. The right front wheel 5R and the left front wheel 5L turn around the same center which is located on the intermediate line P at a point $O_1$.

Stated more specifically, the crawler-belt vehicle can ignore the effect of a centrifugal force. Now considering that the vehicle is making a turn at a very low speed, in order to minimize side slip of the crawler belts 9L, 9R, the front wheels 5L, 5R and the crawler belts 9L, 9R must turn around the same center or point. To cope with this requirement, the intermediate line P, a steering angle perpendicular $R_1$ of the right front wheel 5R (i.e., a line interconnecting a right kingpin 34R and the center $O_1$ of turn of the right front wheel 5R), and a steering angle perpendicular $L_1$ of the left front wheel 5L (i.e., a line interconnecting a left kingpin 34L and the center $O_1$ of turn of the left front wheel 5L) cross together or converge at the same point $O_1$.

The intermediate line P is located substantially intermediately between the rear axle centerline H and the intermediate axle centerline G. More specifically, the proportion or ratio of the distance X between the intermediate axle centerline G and the intermediate line P to the distance between the intermediate line P and the rear axle centerline H is determined by a dynamic weight distribution (weight distribution while the vehicle is running) between the front wheels 5, rear wheels 6 and intermediate wheels 7, for example. In the case where the dynamic weight distribution between the rear wheels 6 and the intermediate wheels 7 is 6:4, the ratio of X to Y is approximately 6 to 4 (X:Y=6:4). Similarly, in the case where the dynamic weight distribution between the rear wheels 6 and the intermediate wheels 7 is 7:3, the X to Y ratio is approximately 7 to 3 (X:Y=7:3).

Operation of the crawler-belt vehicle of the foregoing steering geometry will be described below with reference to FIGS. 9 and 10.

Figure 9:
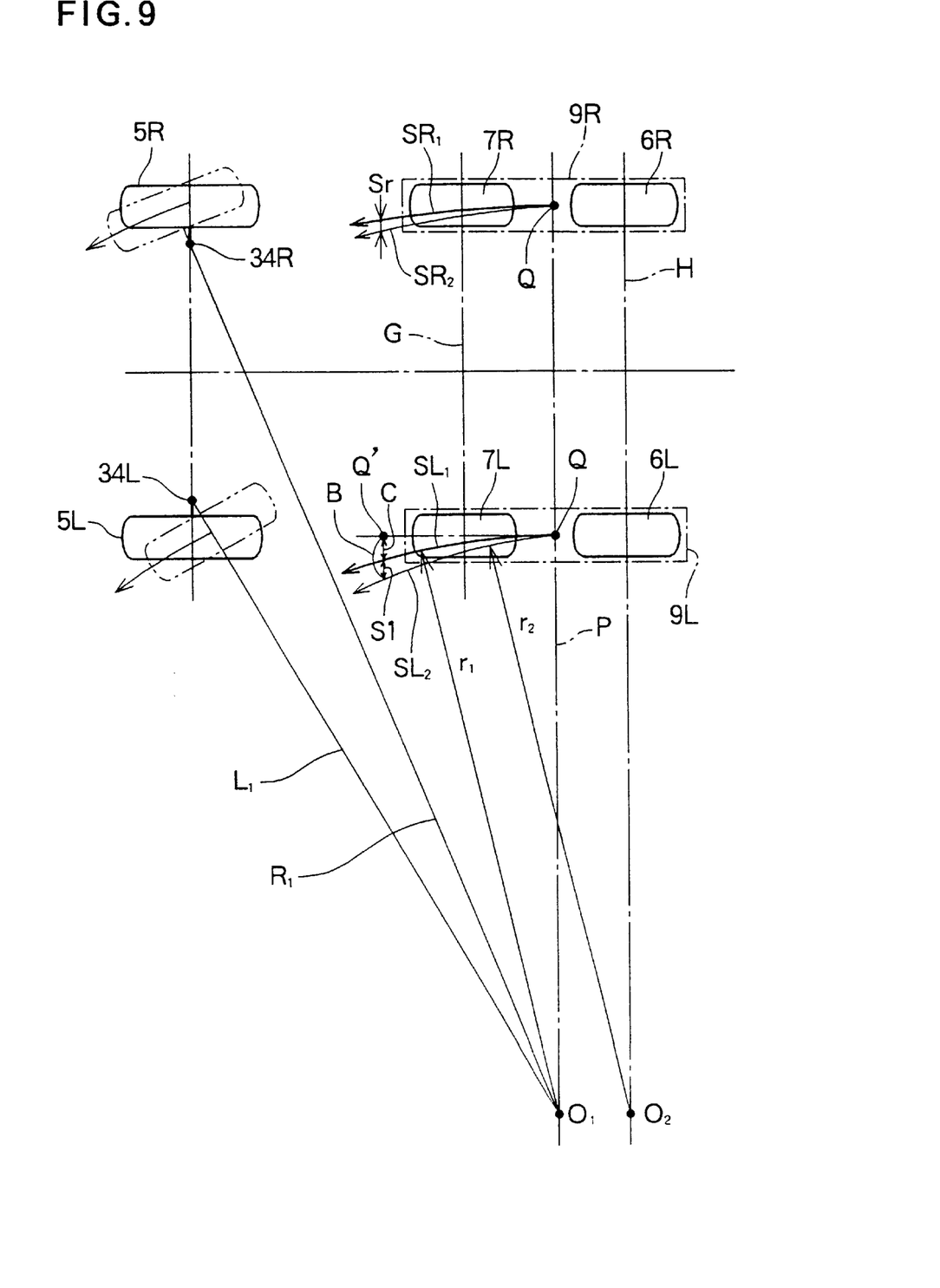
FIG. 9 is a diagrammatical view illustrative of operation of a crawler-belt vehicle according to an example of the present invention.
Figure 10:
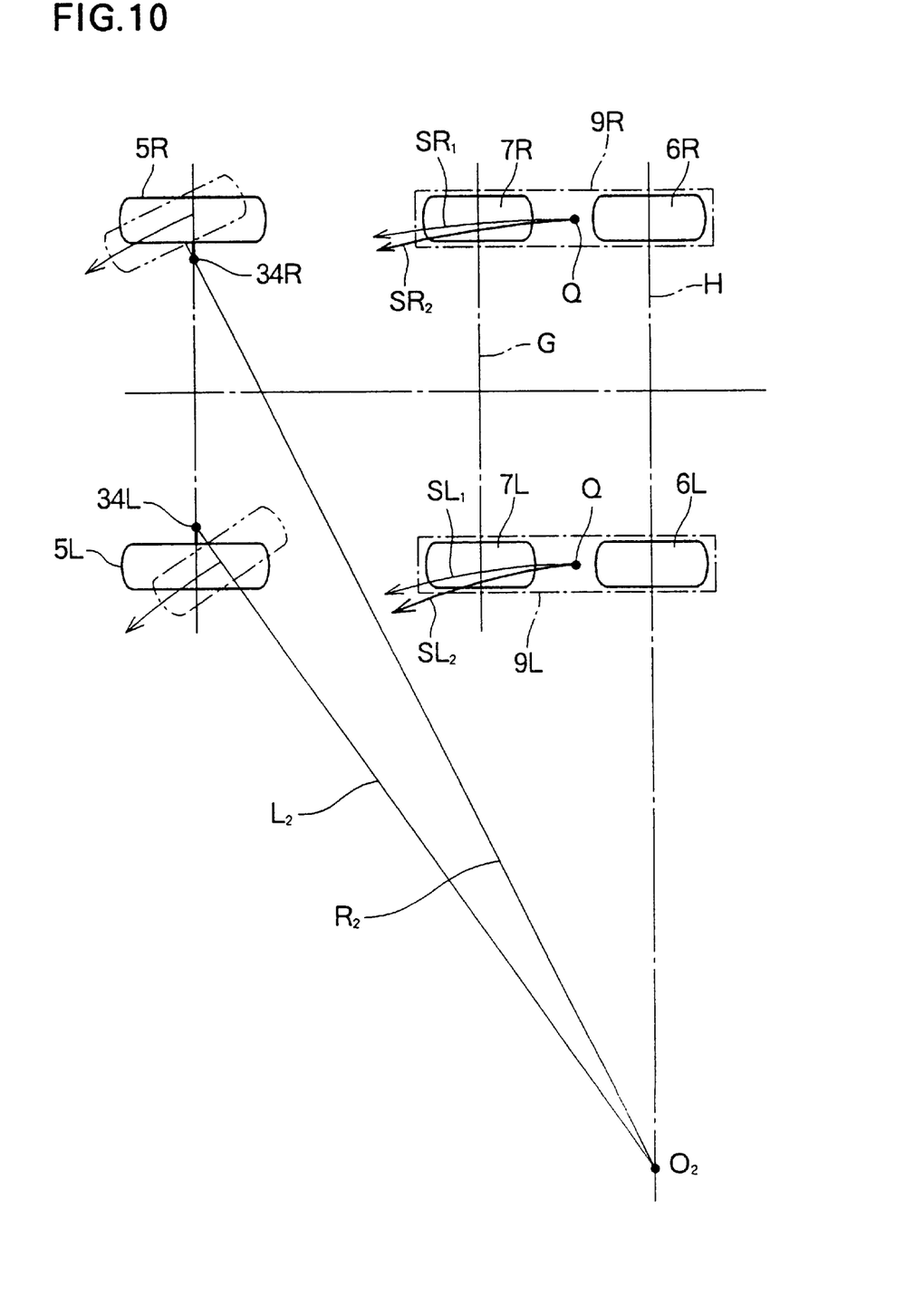
FIG. 10 is a diagrammatical view illustrative of the operation of a crawler-belt vehicle according to a comparative example.

FIG. 9 is a diagrammatical view illustrative of the operation of a crawler-belt vehicle according to an example of the present invention, and FIG. 10 is a diagrammatical view illustrative of the operation of a crawler-belt vehicle according to a comparative example. For better understanding, the comparative example shown in FIG. 10 will be described first, followed by description of the inventive example shown in FIG. 9.

The crawler-belt vehicle according to the comparative example shown in FIG. 10 is constructed such that a rear axle centerline H of the rear wheels 6L, 6R, a turning center of the left front wheel 5L, and a turning center of the right front wheel 5R meet at the same point $O_2$. A steering angle perpendicular $R_2$ of the right front wheel 5R and a steering angle perpendicular $L_2$ of the left front wheel 5L converge at the point $O_2$.

An imaginary turning center Q of each crawler belt 9L, 9R (which is determined by the dynamic weight distribution between the front wheels, intermediate wheels, and rear wheels) moves along an arcuate turning locus $SL_2$, $SR_2$ described about the point $O_2$. Thus, the crawler belts 9L, 9R make a turn while inclining along the respective turning loci $SL_2$, $SR_2$.

On the other hand, in the case of the crawler-belt vehicle according to the inventive example shown in FIG. 9, an imaginary turning center Q of each crawler belt 9L, 9R moves along an arcuate turning locus $SL_1$, $SR_1$. Thus, the crawler belts 9L, 9R make a turn while inclining along the respective turning loci $SL_1$, $SR_1$.

The turning locus $SL_1$ is a locus described by turning a turning radius $r_1$ about the point $O_1$, and the turning locus $SL_2$ is a locus described by turning a turning radius $r_2$ about the point $O_2$. The point $O_1$ is located forwardly of the point $O_2$, and so at a given point Q' spaced forwardly from the imaginary turning center Q by a given distance, the turning locus $SL_1$ deviates from the given point Q' by a distance C while the turning locus $SL_2$ deviates from the given point Q' by a distance B. The amount of deviation C of the turning locus $SL_1$ according to the inventive example shown in FIG. 9 is smaller than that B of the turning locus $SL_2$ in the comparative example of FIG. 10 by S1 (B–C). This means that the amount of deviation in the vehicle width direction (lateral direction) from the imaginary turning center Q is smaller in the turning locus $SL_1$ of the inventive example than in the turning locus $SL_2$ of the comparative example. Likewise, the turning locus $SR_1$ of the inventive example is smaller in lateral deviation at the point Q' than the turning locus $SR_2$ of the comparative example by Sr.

Consequently, the amount of side slips (i.e., slips in the vehicle width direction) of the crawler belts 9L, 9R appearing directly below the rear wheels 6 and the intermediate wheels 7L, 7R while the crawlers make a turn is smaller in the inventive example than in the comparative example shown in FIG. 10.

With this small side slip, the crawler belts 9L, 9R are in no danger of getting detached from the wheels 6, 7. Accordingly, the crawler-belt vehicle can maintain a good turning characteristic even when it is running on a road surface having a great running resistance.

In the case of the crawler belts 9L, 9R, the difference between the side slips appearing directly below the rear wheels 6L, 6R and the side slips appearing directly below the intermediate wheels 7L, 7R is relatively small, and so a side slip force acting on the crawler belts 9L, 9R as a result of the difference in side slips is small, too. Accordingly, the side guide portions 9a of each crawler belt 9L, 9R are prevented from being forced by undue side slip force against the shoulder portions of the tires on the rear wheels 6 and the intermediate wheels 7. Thus, the crawler belts 9L, 9R are very unlikely to be detached from the wheels 6, 7 and have a small running resistance.

According to the present invention, at least one of the front wheels 5, rear wheels 6, and the intermediate wheels 7 may constitute drive wheels of the crawler-belt vehicle 1. For instance, the drive wheels may be formed by the rear wheels 6, the intermediate wheels 7, or the combination thereof.

The rear wheels 6 and the intermediate wheels 7 should by no means be limited to wheels furnished with tires.

The crawler-belt vehicle 1 is not limited in construction to the type equipped with roller wheels 8. The number of roller wheels 8, when used, may be one or plural.

The sub-beam 53 is not limited to the illustrated two-piece structure consisting of the beam member 56 and the beam extension member 57 but may include a one-piece structure in which the beam member 56 and the beam extension member 57 are formed integrally.

The sub-beam 53 may be a part attached to the vehicle body frame 4 regardless of whether it is swingable or fixed. In addition, the sub-beam 53 may be attached to an intermediate portion of the vehicle body frame 4 rather than the rear portion of the vehicle body frame 4.

Obviously, various minor changes and modifications of the present invention are possible in the light of the above teaching. It is therefore to be understood that within the scope of the appended claims the invention may be practiced otherwise than as specifically described.

What is claimed is:

1. A crawler-belt vehicle comprising:

left and right front wheels attached to a front portion of a vehicle body and furnished with balloon tires;

left and right intermediate wheels and left and right rear wheels that are attached through a suspension system to a rear portion of said vehicle body;

a pair of crawler belts made of a flexible material and each extending between said intermediate wheel and said rear wheel on the same side;

said front wheels having a diameter larger than the diameter of said intermediate wheels and the diameter of said rear wheels, said tires comprising rubber containing low pressure air;

an engine powering a transmission;

forward-extending and rearward-extending drive shafts from said transmission;

forward and rearward differential units connected to said drive shafts;

front right and left axle shafts extending from said forward differential unit to drive said front wheels;

rear right and left axle shafts extending from said rearward differential unit to drive said rear wheels;

right and left sub-beams extending toward the forward direction of travel of said vehicle;

right and left intermediate axle spindles each attached to an outer side of a front end of said sub-beams;

each of said intermediate wheels being rotatable mounted on an outer end of said intermediate axle spindles;

said intermediate wheels being set to toe in;

a swing tube extending transversely of said vehicle between said rear drive wheels;

said sub-beams being attached at rear ends thereof to said swing tube;

said rear right and left axle shafts extending through said swing tube to connect said rear drive wheels; and said swing tube being swingably attached to said vehicle frame via right and left swing arms;

wherein said vehicle is four-wheel drive with front wheels larger in diameter than the intermediate and rear wheels which are swingable relative to the vehicle frame so that said vehicle has improved turning performance and breakthrough performance on snow or a muddy road surface.

2. A crawler-belt vehicle according to claim 1, wherein an axis of said intermediate axle spindle is inclined toward the forward direction of travel of said vehicle, thereby providing said intermediate wheel with said toe-in.

3. A crawler-belt vehicle comprising:

front wheels furnished with tires and attached to left and right sides of a front portion of a vehicle body;

intermediate wheels and rear wheels that are attached to left and right sides of a rear portion of said vehicle body;

a pair of crawler belts each extending between said intermediate wheel and said rear wheels on the same side;

at least one of said intermediate wheels and said rear wheels being driven, and said front wheels being steered; and an intermediate line extending parallel to, and passing substantially intermediately between, an axle centerline of said intermediate wheels and an axle centerline of said rear wheels being arranged to meet with a center of turn of said front wheel on the right side, and a center of turn of said front wheel on the left side at the same point.

4. A crawler-belt vehicle comprising:

front wheels furnished with tires and attached to left and right sides of a front portion of a vehicle body;

intermediate wheels and rear wheels that are attached to left and right sides of a rear portion of said vehicle body;

a pair of crawler belts each extending between said intermediate wheel and said rear wheels on the same side;

said front wheels having a diameter larger than the diameter of said intermediate wheels and the diameter of said rear wheels;

said intermediate wheels being set to toe in; and an intermediate line extending parallel to, and passing substantially intermediately between, an axle centerline of said intermediate wheels and an axle centerline of said rear wheels being arranged to meet with a center of turn of said front wheel on the right side, and a center of turn of said front wheel on the left side at the same point.

* * * * *